(12) United States Patent
Boving

(10) Patent No.: US 10,678,292 B2
(45) Date of Patent: Jun. 9, 2020

(54) MANUALLY OPERABLE CONTROL DEVICE

(71) Applicant: GRAMMER AG, Amberg (DE)

(72) Inventor: Marko Boving, Regensburg (DE)

(73) Assignee: GRAMMER AG, Amberg (DE)

( * ) Notice: Subject to any disclaimer, the term of this patent is extended or adjusted under 35 U.S.C. 154(b) by 26 days.

(21) Appl. No.: 16/033,443

(22) Filed: Jul. 12, 2018

(65) Prior Publication Data

US 2019/0018442 A1    Jan. 17, 2019

(30) Foreign Application Priority Data

Jul. 14, 2017    (DE) .................. 10 2017 115 849

(51) Int. Cl.
| | |
|---|---|
| *G05G 9/047* | (2006.01) |
| *G05G 5/05* | (2006.01) |
| *E02F 9/20* | (2006.01) |
| *B62D 1/12* | (2006.01) |
| *G05G 9/04* | (2006.01) |
| *G05G 9/02* | (2006.01) |

(Continued)

(52) U.S. Cl.
CPC ............... *G05G 9/047* (2013.01); *B62D 1/12* (2013.01); *E02F 9/2004* (2013.01); *E02F 9/2029* (2013.01); *E02F 9/2058* (2013.01); *G05G 1/025* (2013.01); *G05G 1/10* (2013.01); *G05G 5/05* (2013.01); *G05G 9/02* (2013.01); *G05G 9/04* (2013.01); *G05G 9/04792* (2013.01); *G05G 2009/04714* (2013.01); *G05G 2009/04751* (2013.01); *G05G 2009/04774* (2013.01); *G05G 2009/04781* (2013.01)

(58) Field of Classification Search
CPC ....... E02F 9/2004; E02F 9/2087; E02F 9/029;
E02F 9/2058; B62D 7/14; B62D 1/12;
G05G 1/00; G05G 1/02; G05G 1/025;
G05G 1/08; G05G 1/10; G05G 5/00;
G05G 5/04; G05G 5/05; G05G 5/26;
G05G 7/00; G05G 9/00; G05G 9/02;
G05G 9/04; G05G 9/047; G05G 9/04792;
G05G 2009/04703; G05G 2009/04751;
G05G 2009/04781; G05G 2009/04714;
G05G 13/00; B60K 2370/133
USPC ....... 74/471 XY, 485, 471 R, 525, 503, 510, 74/490.08; 345/161, 184; 463/38
See application file for complete search history.

(56) References Cited

U.S. PATENT DOCUMENTS 2,746,573 A  *  5/1956  Hastings ................. F16D 59/00
                                                          74/10.2
4,158,845 A  *  6/1979  Pinson ..................... H01Q 3/10
                                                          244/3.16

(Continued)

FOREIGN PATENT DOCUMENTS

DE          10345397         4/2004

OTHER PUBLICATIONS

Official Action with English Translation for German Patent Application No. 102017115849.9, dated Mar. 19, 2018, 10 pages.

*Primary Examiner* — Joseph Brown
(74) *Attorney, Agent, or Firm* — Sheridan Ross P.C.

(57) ABSTRACT

A manually operable control device for controlling moveable elements of a vehicle is disclosed. The control device may comprise a control rod element, which may be mounted so as to be slidable within a first guide path of a first control disc and within a second guide path; and the two control discs may be mounted so as to rotate independently of one another about a common axis in a continuous manner.

20 Claims, 11 Drawing Sheets

(51) Int. Cl.
 *G05G 1/02* (2006.01)
 *G05G 1/10* (2006.01)

(56) References Cited

U.S. PATENT DOCUMENTS

| | | | | |
|---|---|---|---|---|
| 5,430,511 | A * | 7/1995 | Paff | G08B 13/19689 |
| | | | | 341/22 |
| 8,344,834 | B2 * | 1/2013 | Niiyama | G06F 3/0338 |
| | | | | 335/205 |
| 9,134,187 | B1 * | 9/2015 | Organ | G05G 9/047 |
| 9,252,772 | B2 * | 2/2016 | Nakase | H03K 17/965 |
| 2006/0117894 | A1 * | 6/2006 | Sawada | G05G 5/05 |
| | | | | 74/479.01 |
| 2007/0068785 | A1 * | 3/2007 | Lee | G05G 9/047 |
| | | | | 200/339 |
| 2010/0242661 | A1 * | 9/2010 | Mignano | B25J 5/04 |
| | | | | 74/490.08 |
| 2014/0230716 | A1 | 8/2014 | Ishikawa et al. | |
| 2014/0360308 | A1 * | 12/2014 | Lumsden | G05G 13/00 |
| | | | | 74/490.13 |
| 2016/0282897 | A1 * | 9/2016 | Park | G05G 5/04 |
| 2017/0160765 | A1 * | 6/2017 | Zhao | F16D 71/00 |

* cited by examiner

MANUALLY OPERABLE CONTROL DEVICE

CROSS-REFERENCE TO RELATED APPLICATIONS

This application claims the benefit of German Patent Application No. 10 2017 115 849.9 filed Jul. 14, 2017, the entire contents of which are incorporated herein by reference.

FIELD

The invention relates to a manually operable control device for controlling movable elements of a vehicle, according to the preamble of claim 1, and to a vehicle according to the preamble of claim 10.

BACKGROUND

Vehicles, which are equipped with a plurality of movable elements within the meaning of functional components or functional modules, conventionally comprise control elements for controlling said movable elements. Tractors, forklifts or even diggers used as excavating machines can be cited as examples of such vehicles. Tractors comprise, for example, a front loader which is pivotally arranged on the tractor by a first end. A bucket or fork, for example, is pivotally arranged on the second end. A plurality of bars, for example, are arranged between the first and second end, which bars can also be pivotable relative to one another about a plurality of axes.

Joysticks or control rods, which are arranged inside the vehicle cabin so as to be manually operable by the user of the vehicle, are known from the prior art for controlling movable elements or the movement functions thereof. The problem with conventional joysticks is that the movement, which the vehicle driver must carry out over several hours of shifts, as is often the case when working in the fields or the like, in order to move the joystick, can lead to overstrain, fatigue, paresthesia and pain, in particular in the shoulder of the user of the vehicle.

SUMMARY

Similarly, the present invention relates to control devices for steering and/or accelerating vehicles, in particular offroad vehicles.

The object of the present invention is therefore to enhance the conventional control devices to such an extent that largely fatigue- and pain-free work is possible. Moreover, the control device according to the invention is intended to be able to hold the control element in a given position.

This object is achieved according to the features of claim 1 and the features of claim 10.

An essential aspect of the invention is, that a manually operable control device for controlling movable elements of a vehicle and/or for steering or accelerating a vehicle is provided, said control device comprising a control rod element, which is mounted so as to be slidable within a first guide path of a first control disc and within a second guide path of a second control disc, the first guide path being designed differently from the second guide path and the two control discs being mounted so as to rotate independently of one another about a common axis in a continuous manner.

On account of the differing design of the two guide paths, the control rod element can in fact be advantageously held in the current position thereof, since it is securely mounted by means of the guiding action along the two guide paths. In addition, the control rod element can advantageously be guided within the guide paths by means of a rotation of the two control discs.

Within the meaning of the present invention, the position of the control rod element in relation to the first and/or second control disc is advantageously given in polar coordinates. A polar coordinate system is a two-dimensional coordinate system in which each point in a plane (for example, in the present case, a position point of the control rod element in relation to a surface that results from a planar extension of at least one of the two control discs) is determined by a distance r from a predetermined fixed point and an angle φ to a fixed direction.

For example, the fixed point (also referred to as the pole) in the present case corresponds to the common axis or axis of rotation of the two control discs. Furthermore, a freely selectable axis through the fixed point, for example, corresponds to the fixed direction. The ray between the pole and the position point is referred to as the polar axis. The distance r from the pole is referred to as the radial coordinate. The angle φ is referred to as the angular coordinate.

The control rod element can preferably be manually operated by a user of the vehicle. The design with regard to continuous rotatability of the two control discs ensures the greatest possible flexibility of the depictable movements. Preferably, the rotatability of the two control discs is designed to be continuous in both directions of rotation. The movement of the two control discs can advantageously be coordinated by means of the common axis of rotation.

Although the control rod element can be slid along the guide paths, said control rod element is also preferably arranged so that it is not pivotable with respect to the control discs and guide paths.

The common axis of rotation of the two control discs is in this case preferably arranged merely virtually, such that the control discs in particular are in a position of the common axis of rotation that is free from elements for the rotational mounting of said control discs. Further preferably, the common axes of rotation correspond to the centre point of the first and/or second control disc; for example, the two control discs are substantially circular.

Preferably, proceeding from the control rod element, firstly the first control disc and then the second control disc are arranged in the direction of the common axis.

The first and/or second guide path correspond, for example, to a path as created when a rectangle or a circle having a specific diameter are drawn along a directrix in each case. Preferably, at least one or both of the directrices is two-dimensional.

It is advantageous in this case, if the first guide path is straight and/or is arranged so as to extend through the axis.

Preferably, the relative movement between the control rod element and the first control disc is therefore a purely translational movement. If the first guide path extends through the common axis of rotation and the control rod element is in the position of the common axis of rotation, no movement of the control rod element can be triggered at this point by means of a rotation of the control discs.

If the common axis of rotation forms the centre point of the control disc and if, at the same time, the first guide path is straight and is arranged so as to extend through the common axis of rotation, each point on the control disc can be reproduced by means of a relative movement between the first control disc and the control rod element. In other words, the control rod element, in particular the centre point thereof or the centre axis thereof, can move to any point within the perimeter of the first control disc under said conditions. Of course, it is possible for the points entirely outside on the perimeter of the first control disc to be excluded if the planar extension of the control rod element in the direction of the planar extension of the first control disc prevents the control rod element from moving to the external points of the control disc.

Furthermore, it is preferable, if the second guide path is designed as a spiral and/or is arranged so as to extend through the common axis.

In this case, the spiral extends along a two-dimensional curve which is designed to extend proceeding from the start point thereof, around the common axis, and so as to move away therefrom.

The spiral shape ensures that multiple position points on the second control disc can be reproduced in the radial direction of the second control disc by means of the control rod element.

Within the meaning of the present invention, the totality of the position points that can be reproduced by the control rod element in conjunction with the first control disc is understood to mean a first fixed and a first entire range of movement (for the movement of the control rod element on the first control disc when the control disc is fixed and is rotating). Similarly, the totality of the points that can be reproduced by the control rod element in conjunction with the second control disc is understood to mean a second fixed and a second entire range of movement (for the movement of the control rod element on the first control disc when the control disc is fixed and is rotating).

In this case, the first and second fixed ranges of movement correspond to the first and second guide path, respectively. The first and second entire ranges of movement advantageously correspond to an area of a circle. Advantageously, the underlying circle is designed to have the same diameter for both ranges of movement.

Preferably, the first guide path is designed such that a first end point and a second end point of the first guide path are arranged so as to be adjacent to the outer periphery of the first control disc. Within the meaning of the present invention, "adjacent" is understood here to mean that a value of the radial coordinate of the first and second end point is at least 90% of the radius value of the first control disc. In other words, r preferably encompasses a range of from 0 to 0.9·R1, R1 being the radius of the first control disc.

Preferably, the second guide path is designed such that a first end point of the second guide path is arranged so as to be aligning with the common axis and a second end point is arranged so as to be adjacent to the outer periphery of the second control disc. Within the meaning of the present invention, "adjacent" is understood here to mean that a value of the radial coordinate of the second end point is at least 90% of the radius value of the second control disc. In other words, r preferably encompasses a range of from 0 to 0.9·R2, R2 being the radius of the second control disc.

Further preferably, both radii R1 and R2 have the same value.

Further preferably, the spiral is an Archimedean spiral; i.e. the coordinates of a point on the spiral can be calculated by means of the formula r=a·φ, a being a constant. In other words, the quotient of r and φ is constant.

Furthermore, it is preferable if an angle between a line, which extends through any given point on the spiral and perpendicularly to the radial coordinate thereof, and a tangent, which extends through the given point and tangentially to the spiral, has a value from a range of from 2° to 10°, more preferably from 3° to 7°, most preferably 5°.

Furthermore, it is preferable that φ has a range of which the start is 0 and the end of which is in a range of from 1.5π to 2.5π. Preferably, the end is at 2π; the spiral thus extends precisely once in a circle or once around the periphery of the second control disc.

In this case, it is conceivable, for example, for the previously described angle between the line, which extends through any given point on the spiral and perpendicularly to the radial coordinates thereof, and the tangent, which extends through the given point and extends tangentially to the spiral, to have a constant value only in a range of from 0 to 1.5π. Preferably, the angle in the range of from 1.5π to 2π is greater than in the range of from 0 to 1.5π. If, in this case, the spirals are Archimedean spirals for all ranges, the constant a1 applies to the range of from 0 to 1.5π and the constant a2 applies to the range of from 1.5π to 2π, a2 preferably being smaller than a1.

In practice, it has proven advantageous, if the two control discs are arranged so as to be spaced apart from one another and so as to extend in parallel with one another and/or the control rod element is arranged, with regard to the longitudinal direction thereof, so as to be constantly orthogonal to a planar extension of at least one of the two control discs.

This arrangement gives the user of the control device room to grip the control rod element with a hand without their forearm colliding with one of the control discs.

Furthermore, it is preferable, if the two control discs are designed to be congruent with one another in terms of the outer perimeter thereof.

Furthermore, said two guide paths are preferably not arranged in parallel with one another, projected onto the planar extension thereof, in any relative position of the first guide path to the second guide path that can be set by means of the control device. It is preferable that the first guide path and a tangent of the second guide path, in the position of the control rod element, always form an angle in a range of from 2 to 10°, preferably 5°. In contrast, the two guide paths, projected onto a vertical direction of the control device, which vertical direction preferably corresponds to the longitudinal direction of the control rod element, are preferably arranged in parallel with one another.

Preferably, the two guide paths further each comprise at least one end point which is at the same distance from the common axis of rotation. Preferably, the two end points of the first guide path and a second end point of the second guide path are at the same distance from the common axis of rotation.

In order to facilitate operation of the control device, it has proven particularly advantageous, if the first and/or the second control disc can be actively controlled in each case by means of at least one drive element in terms of a rotational movement about the common axis of rotation. This in particular means that a movement of the control rod element within the two entire ranges of movement can be actively assisted.

Advantageously, the drive elements are designed to be operatively connected to the outer perimeter of the two control discs. For example, output tooth elements which are operatively connected to input tooth elements of the drive elements are arranged on the outer perimeter of the two control discs. Further preferably, the drive elements comprise brushless direct-current motors (BLDC) or stepper motors in addition to the input tooth elements. The advantage of a stepper motor is, for example, that a rotation of the motor shafts and the elements connected thereto, for example the input tooth elements, can be precisely controlled in terms of the angle of rotation to be set.

In order to further relieve the user of the control device, it is advantageous, if a restoring element is provided, by means of which the control rod element can be passively guided back into a starting position. In this case, the starting position of the control rod element is, for example, the position which corresponds to the common axis of the control discs. The restoring element is designed, for example, as a leg spring, one leg of which is rigidly mounted and the other leg of which can be deflected by means of a movement of the control rod element counter to a restoring force.

Moreover, it is advantageous, if a sensor for detecting a movement direction of the control rod element is arranged on the control rod element and if a control unit is provided. In this case, a signal can be transmitted to the superordinate control unit by means of the sensor. The control unit is designed in the form of a PLC (programmable logic controller), for example. A PLC for example has (signal) inputs, (signal) outputs, an operating system or also firmware and an interface, via which an application program can be loaded. The application program establishes how the outputs should be switched on the basis of the inputs.

Furthermore, it is advantageous, if signals of the sensor can be transmitted by means of the control unit to the at least one drive element of the first and/or second control disc. Said control unit then computes, for example with the aid of the application program, at least one signal, which can be passed on to one or more of the drive elements. Therefore, a movement of the control rod element in the detected movement direction, for example, can be assisted (or accelerated) or braked (delayed).

Furthermore, it is advantageous, if a housing is provided, inside which the two control discs, the in each case at least one drive element and the restoring element are mounted. This is advantageous since the mounting of the elements relative to one another can advantageously be configured by means of the housing.

The object of the invention is also achieved by a vehicle, which can be steered and/or accelerated by means of a manually operable control device according to any of claims 1-9, and is further achieved by a vehicle comprising movable elements that can be controlled by means of a manually operable control device according to any of claims 1-9.

Advantageous embodiments can be found in the dependent claims.

BRIEF DESCRIPTION OF THE DRAWINGS

Advantages and expediencies can be found in the following description in conjunction with the drawings, in which.

DETAILED DESCRIPTION

Figure 1:
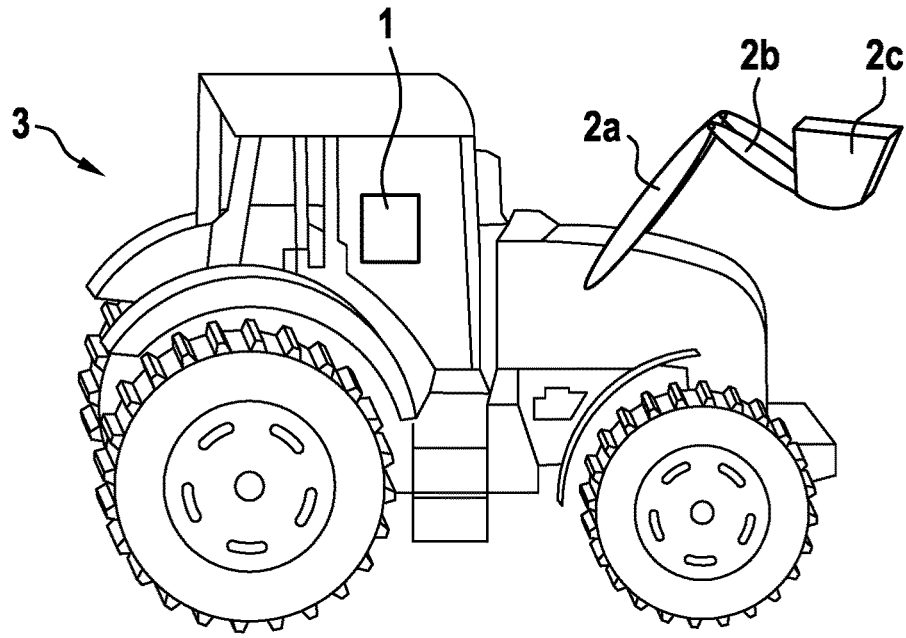
FIG. 1 shows a vehicle comprising movable elements.

In FIG. 1, a vehicle 3 comprising movable elements 2a, 2b, 2c is shown, of which elements at least one can be controlled by means of a manually operable control device 1 (shown only schematically in the vehicle interior). In the present case, the vehicle 3 is a tractor and the movable elements are, for example, the first bar 2a, the second bar 2b or just the bucket 2c of the front loader, or all three elements 2a, 2b, 2c. It would also be possible for a plough or other implement (not shown), which is fastened to the tractor by means of, for example, a three-point trailer hitch, to be one of the movable elements.

Figure 2:
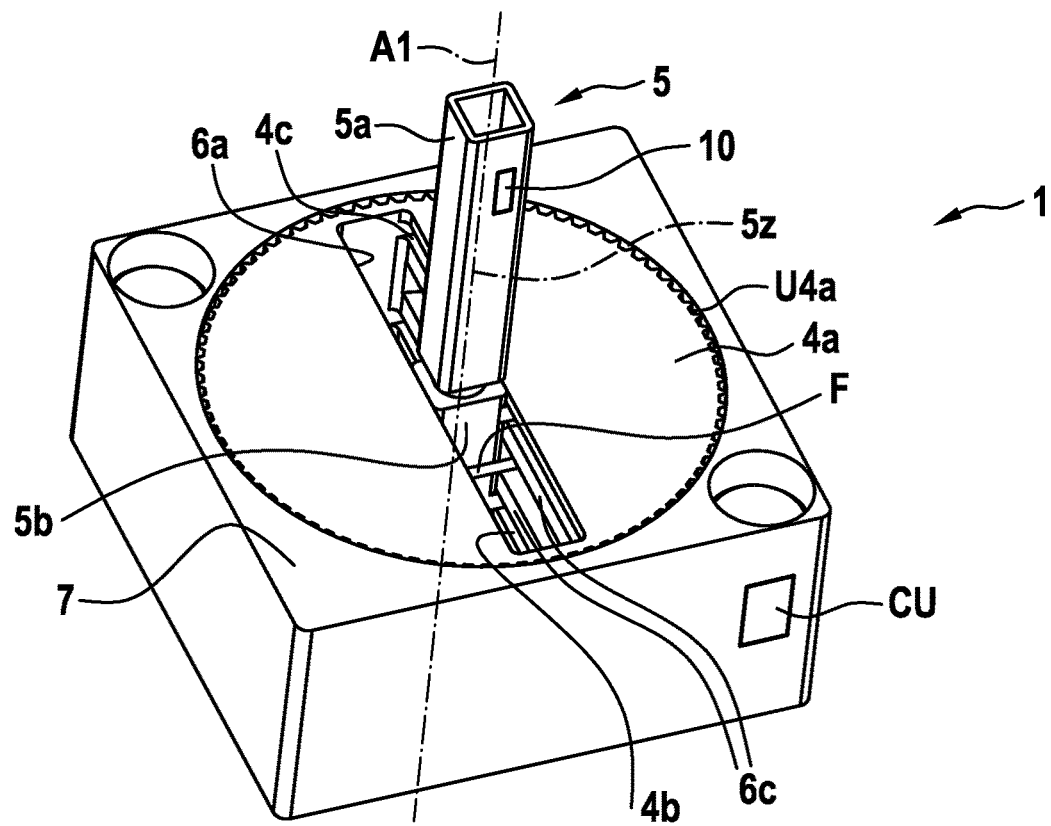
FIG. 2 is a three-dimensional view of a control device according to the invention.

In FIG. 2, the manually operable control device 1 for controlling movable elements 2a, 2b, 2c of a vehicle 3 and/or for steering or accelerating the vehicle 3 is shown in a perspective view, said control device comprising a control rod element 5, which is mounted so as to be slidable within a first guide path 6a of a first control disc 4a and within a second guide path 6b (see FIG. 6) of a second control disc 4b (see FIG. 6), the first guide path 6a being designed differently from the second guide path 6b and the two control discs 4a, 4b being mounted so as to rotate independently of one another about a common axis A1 in a continuous manner.

In the present case, the fixed point of the polar coordinates associated with the control rod element 5 corresponds to the position of the common axis of rotation A1 of the two control discs 4a, 4b.

The control rod element 5 can be manually operated by a user of the vehicle 3. The axis of rotation A1 is in the present case arranged merely virtually, such that the control discs 4a, 4b are in a position of the axis of rotation A1 that is free from elements for the rotational mounting of said control discs. In the present case, the first axis of rotation A1 corresponds to the centre point of the first control disc 4a and the centre point of the second control disc 4b.

The first guide path 6a and second guide path 6b in this case correspond to a path as created when a rectangle (first guide path 6a) or a circle (second guide path 6b), having a specific diameter, is drawn along a directrix in each case. Here, the directrix is in each case two-dimensional.

The first guide path 6a is in this case straight and is arranged so as to extend through the axis A1. The relative movement between the control rod element 5 and the first control disc 4a is therefore a purely translational movement. Since the first guide path 6a in the present case extends through the common axis of rotation A1 and the control rod element 5 according to FIG. 2 is in the position of the common axis of rotation A1, no movement of the control rod element 5 relative to one of the control discs 4a, 4b can be triggered in this case by means of a rotation of the control discs 4a, 4b.

Since the common axis of rotation A1 forms the centre point of the control disc 4a and since, at the same time, the first guide path 6a is straight and is arranged so as to extend through the axis of rotation A1, each point on the control disc can be reproduced by means of a relative movement between the first control disc 4a and the control rod element 5 and by means of a relative movement between the first control disc 4a and the housing 7.

In other words, the control rod element 5, in particular the centre point thereof or the centre axis thereof, can move to any point within the perimeter U4a of the first control disc 4a under said conditions. The points entirely outside on the perimeter U4a of the first control disc 4a are excluded herefrom, since the planar extension of the control rod element 5 in the direction of the planar extension of the first control disc 4a prevents the control rod element 5 from moving to the external points of the control disc 4a.

Figure 5A:
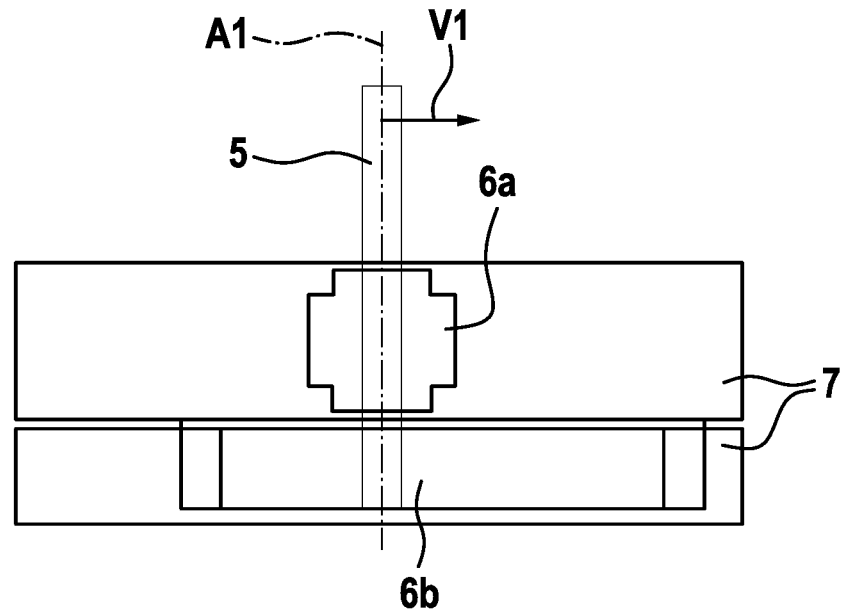
FIG. 5a, 5b are views of the first and the second guide path.
Figure 5B:
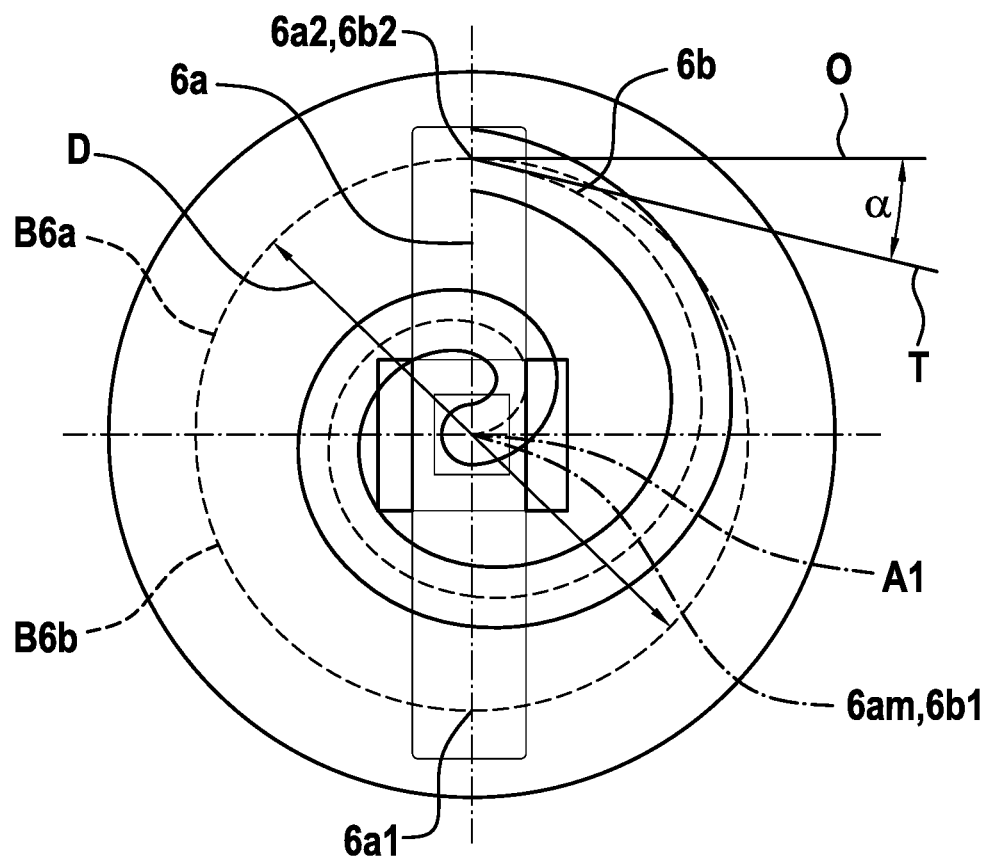
Figure 6:
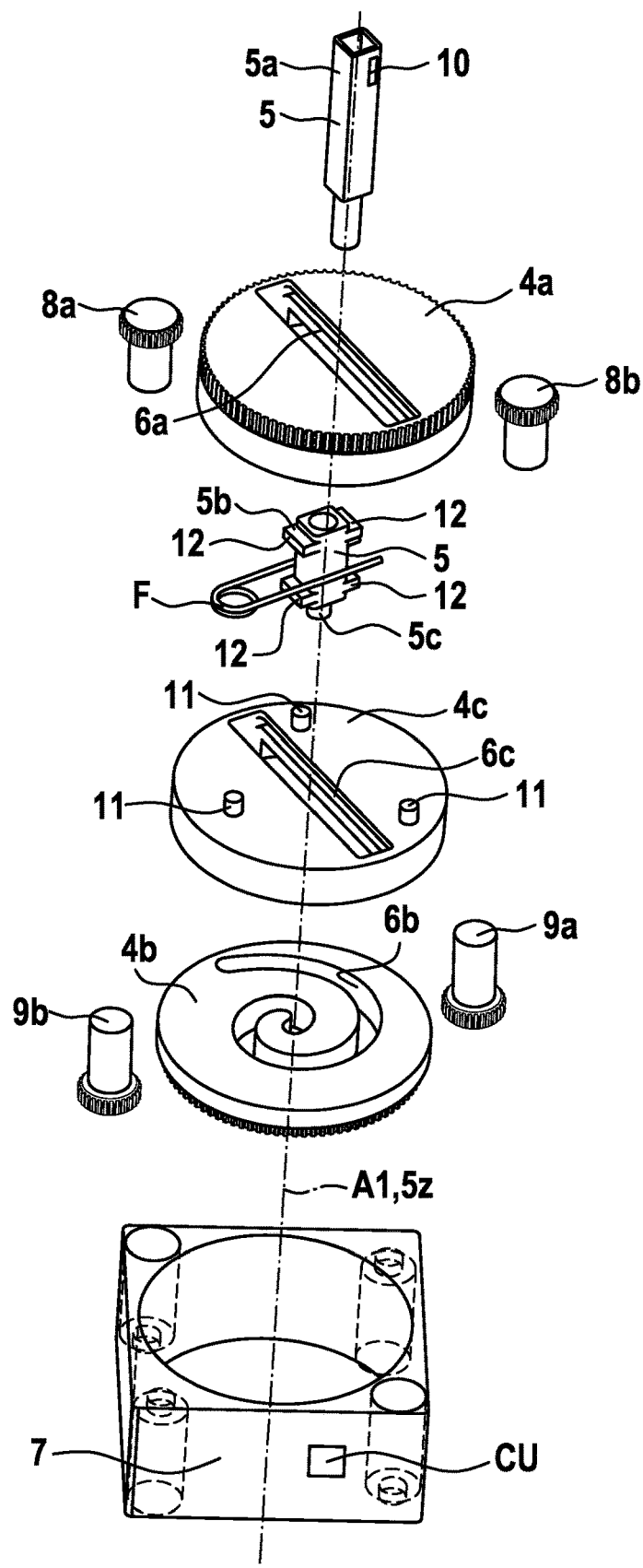
FIG. 6 is an exploded view of the control device according to the invention from FIG. 2.

Furthermore, FIGS. 5b and 6 show that the second guide path 6b is designed as a spiral and is arranged so as to extend through the axis A1. In this case, the spiral follows a curve which is designed to extend, proceeding from the axis A1, around the axis A1 and so as to move away therefrom.

FIG. 5b further shows the first and second fixed ranges of movement of the control rod element 5, which in the present case correspond to the two guide paths 6a, 6b, and the first and second entire ranges of movement B6a, B6b of the control rod element 5.

In the present case, both end points 6a1, 6a2 of the first guide path 6a and a second end point 6b2 of the second guide path 6b are arranged at a common diameter D in relation to the common axis of rotation A1; i.e. they are each at the same distance from the axis A1. A centre point 6am, which is arranged so as to divide the guide path 6a into two equal halves, and a first end point of the second guide path 6b are in the same position as one another and in the same position as the common axis of rotation A1.

When depicting the end points, it was taken into account that the portions of the control rod element 5 that are guided within the guide paths 6a, 6b, have a planar extension. Therefore, the edges of the guide paths 6a, 6b do not coincide with the end points 6a1, 6a2, 6b1, 6b2.

The first B6a and the second entire range of movement B6b are in the present case congruent and correspond to an area of a circle having the diameter D.

The spiral according to the present second guide path is an Archimedean spiral, the angle φ encompassing a range of from 0 to $2\pi$.

Figure 3A:
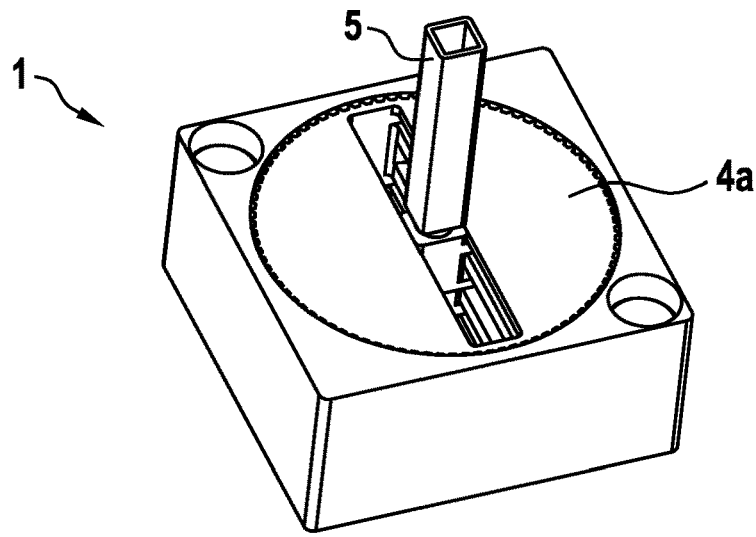
FIG. 3a-h are additional three-dimensional views of the control device according to the invention from FIG. 2.
Figure 3B:
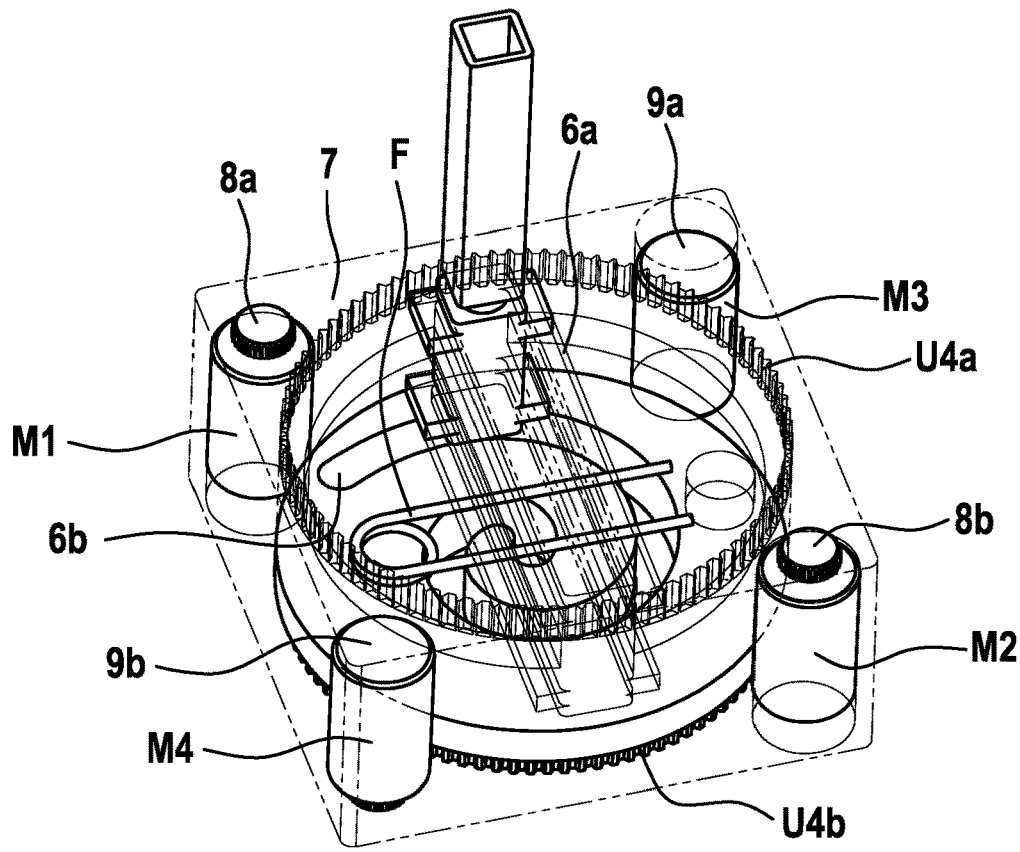
Figure 3C:
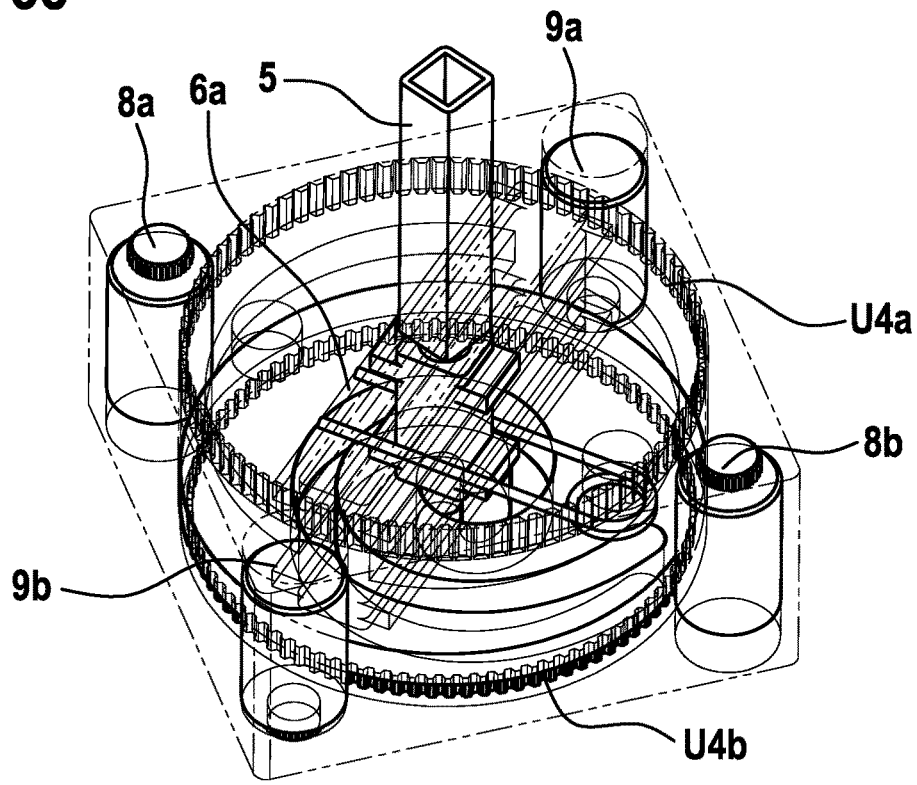
Figure 3D:
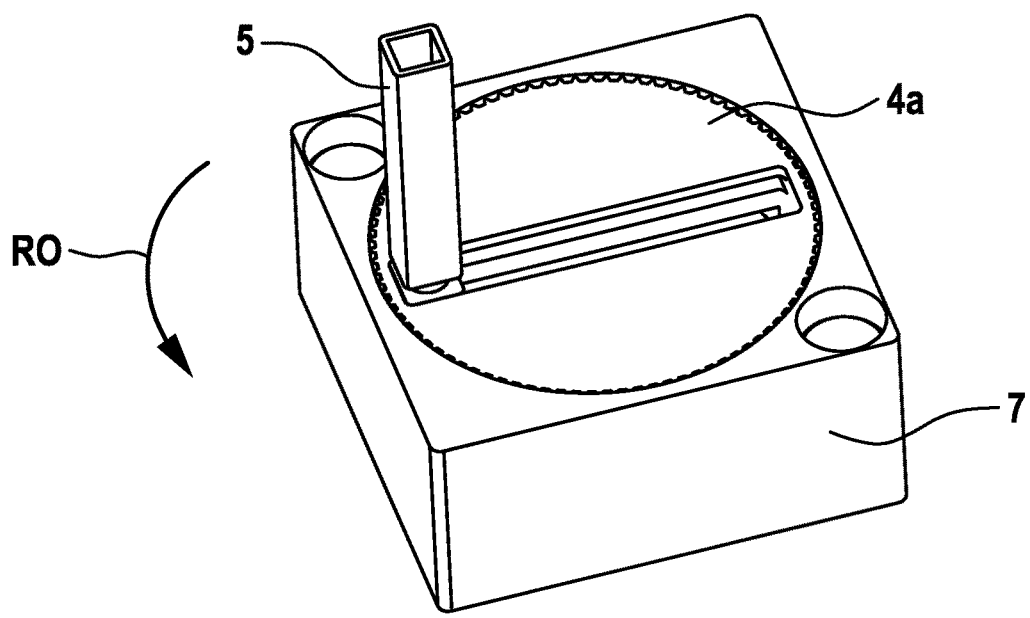

FIGS. 3d to 3h further show various movements, which can be reproduced by means of the control device 1. FIG. 3d shows a purely rotational movement RO of the control rod element 5 together with the two control discs 4a, 4b. During said movement RO, said elements 4a, 4b and 5 do not move relative to one another. However, all three elements 4a, 4b and 5 move together in relation to the housing 7 and to the drive elements 8a, 8b, 9a, 9b. Said rotational movement RO is used to steer the vehicle 3, for example.

Figure 3E:
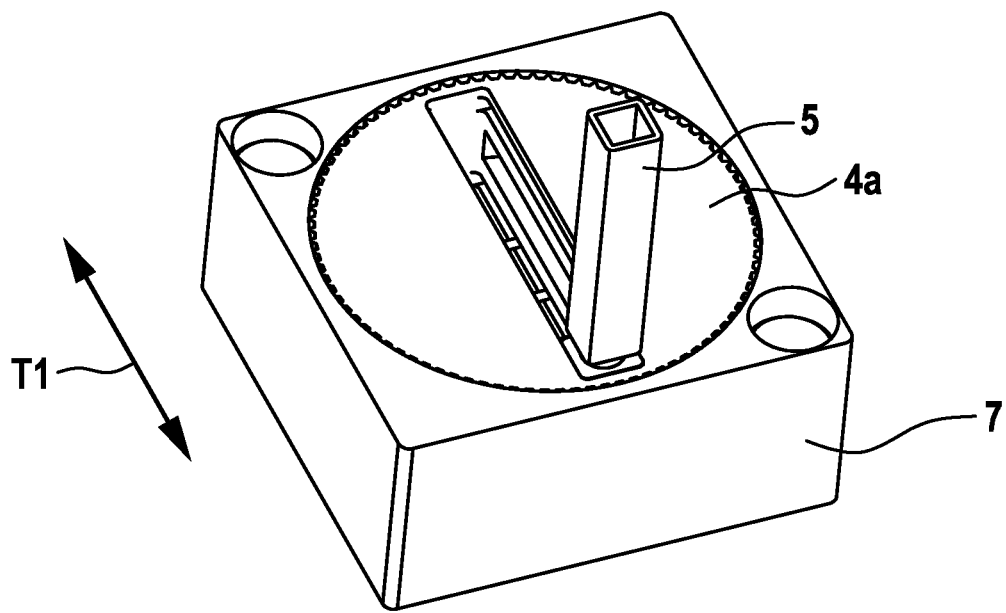
Figure 3F:
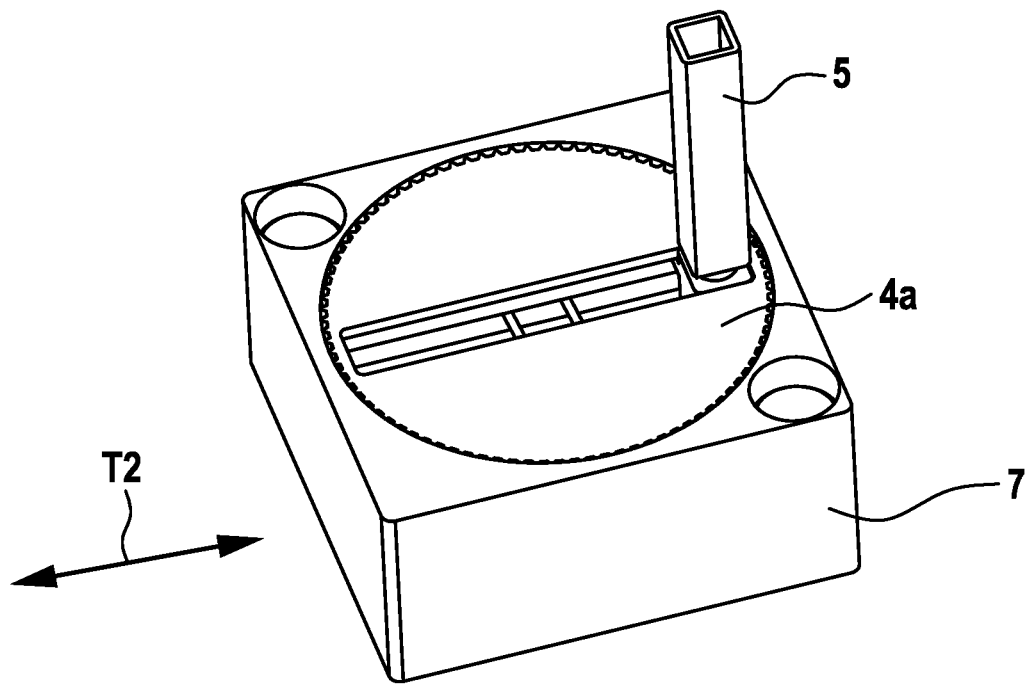

FIGS. 3e and 3f show a purely translational movement T1 and T2, respectively, in different directions. In this case, the first control disc 4a does not move in relation to the housing 7 and to the drive elements 8a, 8b, 9a, 9b. However, the second control disc 4b moves in relation to the first control disc 4a and the control rod element 5 moves in relation to the first control disc 4a and second control disc 4b. Said translational movement T1, T2 is used to accelerate the vehicle 3, for example.

Figure 3G:
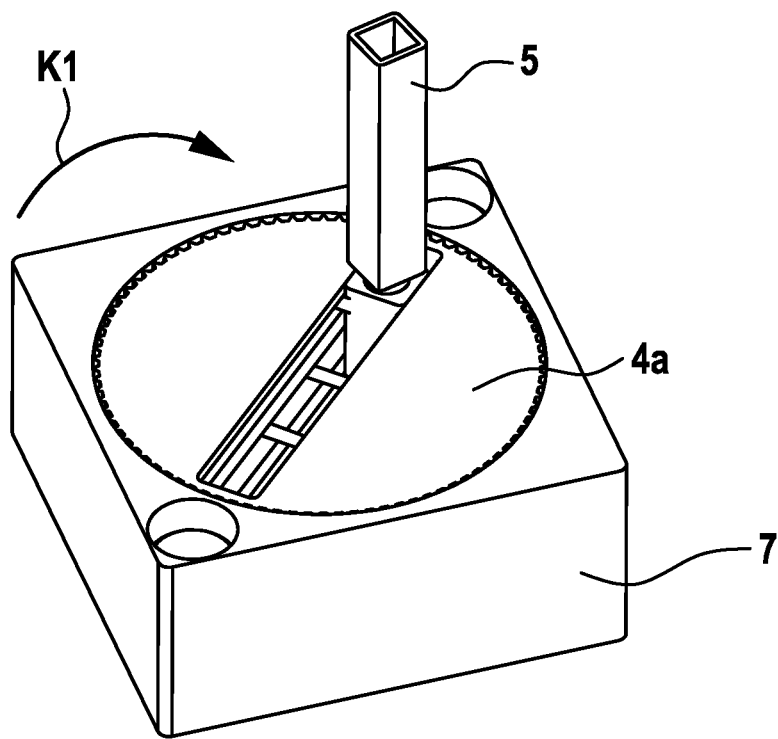
Figure 3H:
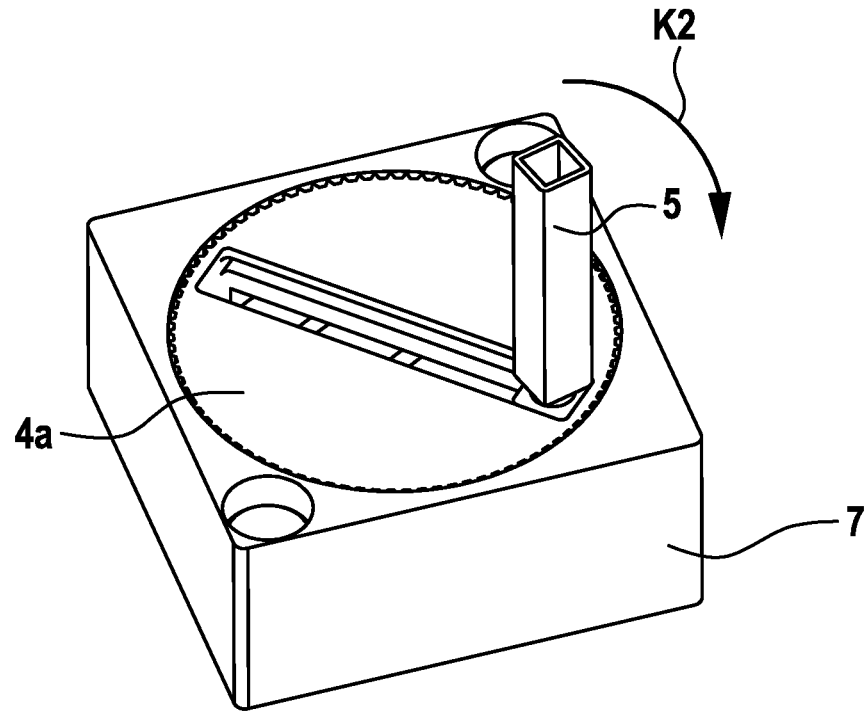
Figure 4A:
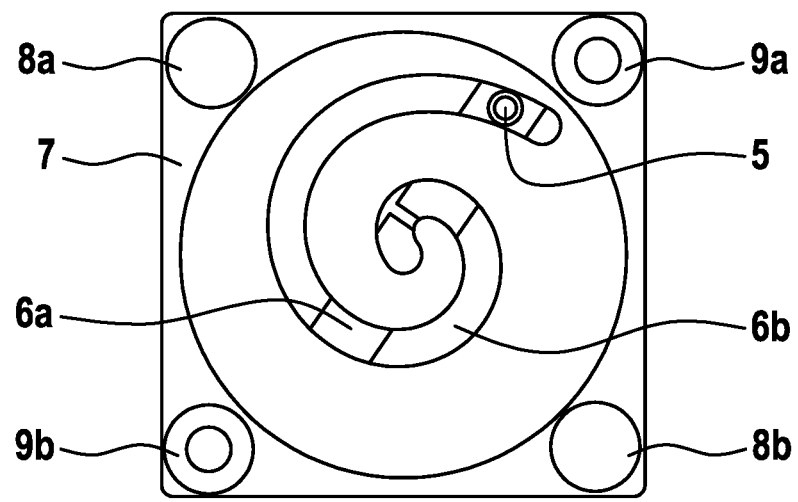
FIG. 4a-g are views of various position points of the control rod element.
Figure 4B:
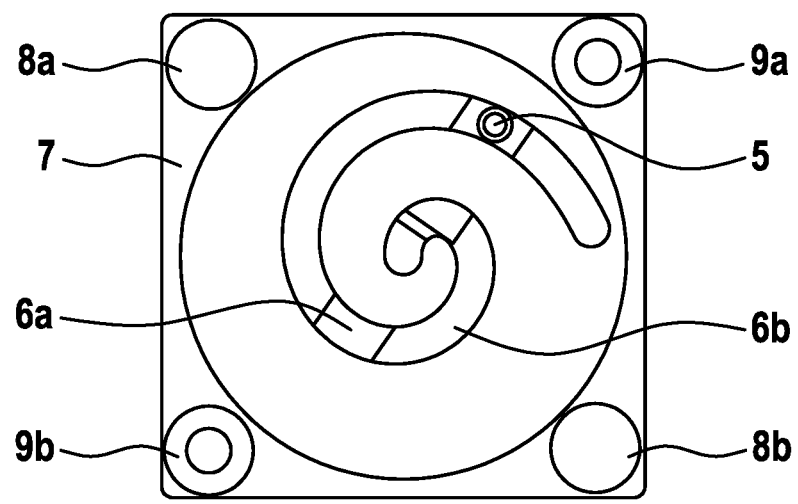
Figure 4C:
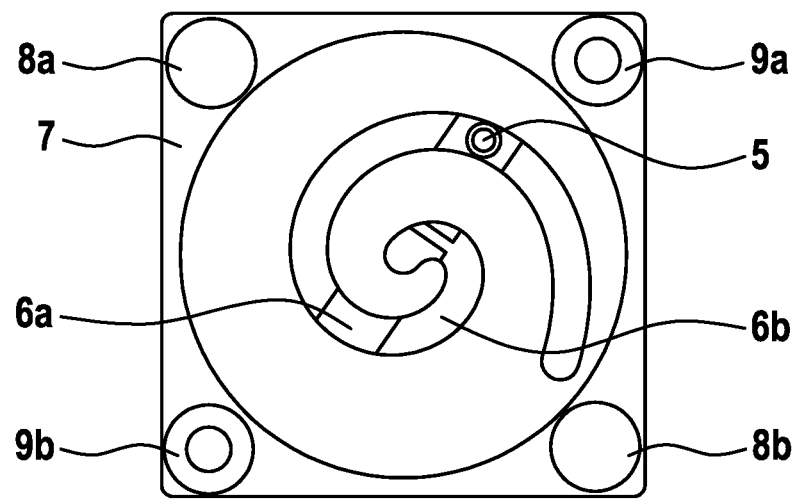
Figure 4D:
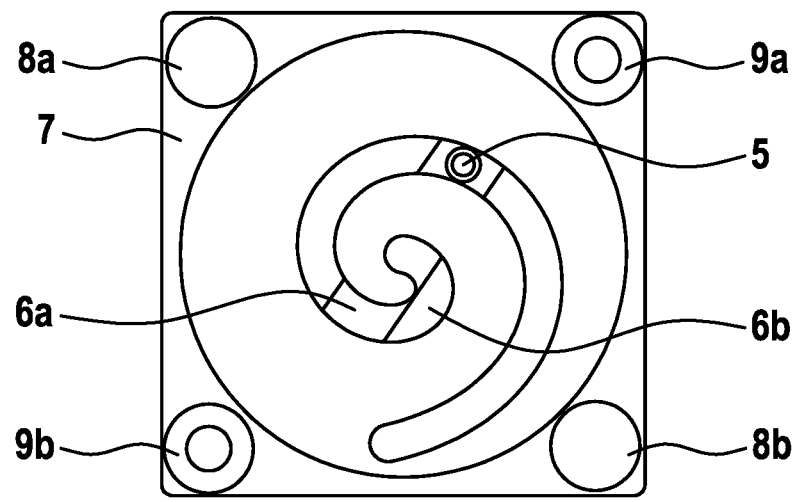
Figure 4E:
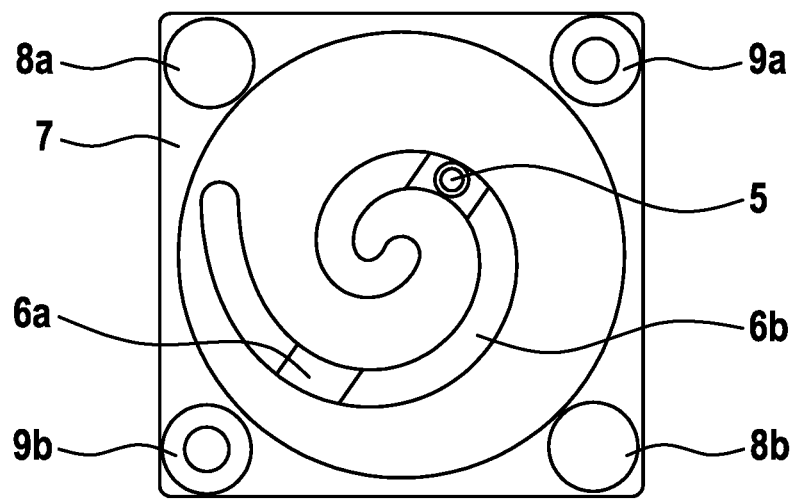
Figure 4F:
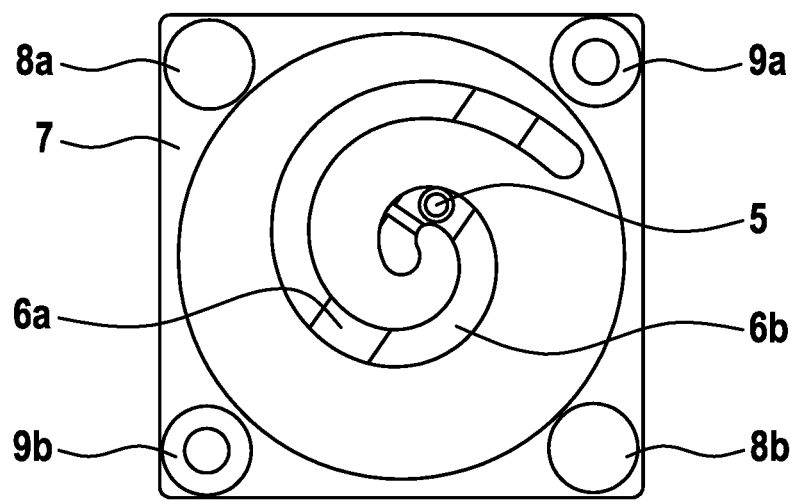
Figure 4G:
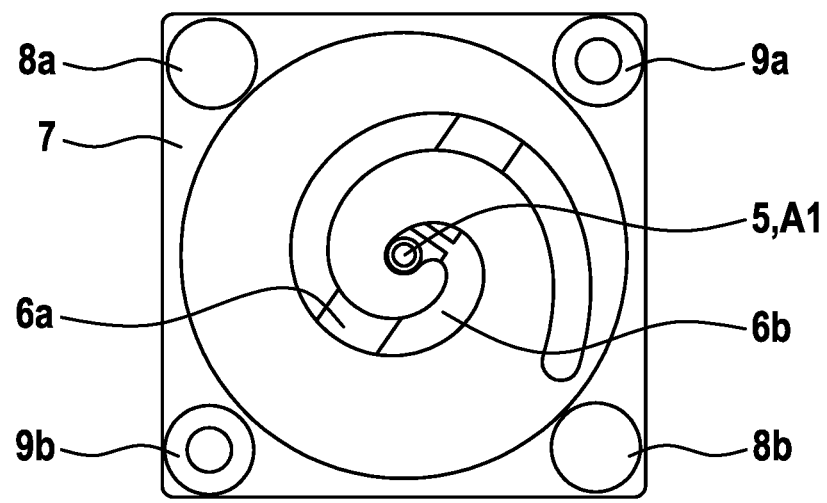

Finally, FIGS. 3g and 3h show a combined movement K1 and K2, respectively. Here, the elements 4a, 4b, 5 move relative to one another in each case and also in relation to the housing 7 and to the drive elements 8a, 8b, 9a, 9b.

The housing 7 and the drive elements 8a, 8b, 9a, 9b are in this case arranged in a fixed manner with respect to one another at least with regard to a position of the shafts of the motors M1, M2, M3, M4 of the drive elements 8a, 8b, 9a, 9b.

The two control discs 4a, 4b are in the present case spaced apart from one another and arranged so as to extend in parallel with one another in the direction of the axis A1 (see FIG. 2). Furthermore, the control rod element 5 is arranged so as to be constantly orthogonal, with regard to the longitudinal direction 5z thereof, to a planar extension of the two control discs 4a, 4b. In the present case, the longitudinal direction 5z and the common axis of rotation A1 coincide.

FIG. 5b further shows that an orthogonal O of the first guide path 6a and a tangent T of the second guide path 6b in the position of the control rod element 5 form an angle α of 5°; this applies in the present case to all conceivable positions of the control rod element 5. In contrast, according to FIG. 5a, both guide paths 6a, 6b, projected onto the direction of the axis A1, are arranged so as to extend in parallel with one another.

FIG. 4a-4g (here the control unit 1 is shown from below) further show a movement sequence of the control rod element 5 along the first guide path 6a, the position of the first control disc 4a in relation to the housing 7 remaining fixed in this case. It can be seen that, in order to carry out said movement, the second control disc 4b must correspondingly rotate as well, such that the control rod element 5 is always securely mounted.

Likewise, according to FIG. 4a-4g, it can be seen that the two guide paths 4a, 4b are not arranged in parallel with one another in any shown position of the first guide path 4a relative to the second guide path 4b. According to FIG. 4g, the control rod element 5 is arranged such that it is aligning with the common axis A1.

FIGS. 3b, 3c and 6 show that the first control disc 4a and the second control disc 4b can be actively controlled in terms of a rotational movement about the axis A1 by means of two drive elements 8a, 8b and 9a, 9b, respectively. In this case, output teeth elements are arranged on the outer perimeter U4a, U4b of the two control discs 4a, 4b, which output teeth elements are operatively connected to input teeth elements of the drive elements 8a, 8b, 9a, 9b (shown only schematically in FIGS. 3b and 3b; according to FIG. 6, the schematically represented output teeth elements and input teeth elements are in each case arranged on a common pitch circle). Said input teeth elements are in turn connected to stepper motors M1, M2, M3, M4 of the drive elements 8a, 8b, 9a, 9b, by means of the movement of which a movement of the input teeth elements can be achieved.

In order to further relieve the user of the control device 1, a restoring element F (see FIGS. 2 and 6) is provided, by means of which the control rod element 5 can be passively guided back into a starting position. In this case, the starting position is the position which corresponds to the position of the control rod element 5 on the common axis of rotation A1. The restoring element F is designed as a leg spring, one leg of which is rigidly mounted and the other leg of which can be deflected by means of a movement of the control rod element 5 counter to a restoring force.

Moreover, a sensor 10 (FIGS. 2 and 6) for detecting a movement direction V1 (see FIG. 5a) of the control rod element 5 is arranged on the control rod element 5 and a control unit CU is provided (see FIGS. 2 and 6). In this case, a signal can be transmitted by means of the sensor 10 to the superordinate control unit CU. Said control unit then computes at least one signal which can be passed on to one or more of the drive elements 8a, 8b, 9a, 9b. Therefore, a movement of the control rod element 5 in the detected movement direction V1, for example, can be assisted or braked.

Furthermore, a housing 7 is provided (see FIG. 2), inside which the two control discs 4a, 4b, the drive elements 8a, 8b, 9a, 9b and the restoring element F are mounted. The control unit CU is arranged inside the housing, as well.

FIG. 6 further shows that the control rod element 5 comprises three elements 5a, 5b, 5c. The first element 5a is arranged substantially above the two control discs 6a, 6b and is used as a handle by the user. A shaft element is formed on the lower end of the first element 5a, and is mounted so as to rotate relative to a second element 5b of the control rod element 5.

A third element 5c in the form of a shaft element is arranged on the lower end of the second element 5b, the control rod element 5 being arranged so as to be slidable within the second guide path 6b by means of the third element 5c. The second element 5b further comprises two inner-rail-like portions 12, by means of which said second element is mounted so as to be slidable between the first control disc 6a and an intermediate disc 4c or between the intermediate disc 4c and the second control disc 6b (see FIG. 2). Gaps between the first control disc 6a and the intermediate disc 4c and between the intermediate disc 4c and the second control disc 6b thus form guide-rail-like portions for guiding the inner-rail-like portions 12.

Proceeding from the control rod element 5, firstly the first control disc 4a, then the intermediate disc 4c and then the second control disc 4b are arranged in the direction of the axis A1.

The intermediate disc 4c also comprises a guide path 6c, which in the present case is designed to be identical to the first guide path 6a. FIG. 6 further shows three positioning elements 11, by means of which a position of the intermediate disc 4c in relation to the first control disc 4a can be locked. Furthermore, the intermediate disc 4c comprises a recess inside which the restoring element F can be arranged. A planar extension of the restoring element F and of the recess of the intermediate disc 4c is parallel to the planar extension of the discs 4a, 4b, 4c.

All the features disclosed in the application documents are claimed as being essential to the invention provided that, individually or in combination, they are novel over the prior art.

LIST OF REFERENCE SIGNS 1 control device
2a, 2b, 2c movable element
3 vehicle
4a, 4b control disc
4c intermediate disc
5 control rod element
5a, 5b, 5c elements
5z longitudinal direction
6a, 6b guide path
6a1, 6a2 first end point
6a2, 6b2 second end point
6am centre point
7 housing
8a, 8b, 9a, 9b drive element
10 sensor
11 positioning elements
12 inner-rail-like elements
A1 common axis of rotation
B6a, B6b entire range of movement
CU control unit
D diameter
F restoring element
M1, M2, M3, M4 motor
O orthogonal
T tangent
T1, T2 translational movement
r radial coordinates
RO rotational movement
R1, R2 radius of the control disc
K1, K2 combined movement
U4a, U4b perimeter
V1 movement direction
α, φ angle

What is claimed is:

1. A manually operable control device for at least one of controlling movable elements of a vehicle and steering or accelerating the vehicle, the device comprising:
    a control rod element, which is mounted so as to be slidable within a first guide path of a first control disc and within a second guide path of a second control disc, the first guide path being designed differently from the second guide path and the two control discs being mounted so as to rotate independently of one another about a common axis in a continuous manner, wherein the first guide path has first and second end points, wherein the second guide path has first and second end points, wherein the first and second endpoints of the first guide path and the second endpoint of the second guide path are located at a common diameter relative to the common axis, and wherein at least one of the first control disc or the second control disc can be actively controlled in terms of a rotational movement about the common axis by means of at least one drive element, the at least one drive element being operatively connected to an outer perimeter of the at least one of the first control disc or the second control disc.

2. The manually operable control device according to claim 1, wherein the first guide path is straight and extends through the common axis.

3. The manually operable control device according to claim 2, wherein the second guide path is designed as a spiral and extends through the common axis.

4. The manually operable control device according to claim 3, wherein both the first control disc and the second control disc are cylindrically shaped, and wherein a radius of the first control disc is equal to a radius of the second control disc.

5. The manually operable control device according to claim 2, wherein at least one of:
    the two control discs are spaced apart from one another and extend planarly in parallel with one another; and
    the control rod element extends in a longitudinal direction orthogonal to a planar extension of at least one of the two control discs.

6. The manually operable control device according to claim 2, wherein the at least one drive element comprises a first drive element and a second drive element, the rotational movement about the common axis of the first control disc is actively controlled by the first drive element, and the rotational movement about the common axis of the second control disc is actively controlled by the second drive element.

7. The manually operable control device according to claim 2, further comprising a restoring element, wherein the restoring element is operatively connected to the control rod element and passively guides the control rod element back into a starting position.

8. The manually operable control device according to claim 1, wherein the second guide path is a spiral and extends through the common axis, wherein a first control input by the control rod element rotates the first and second control discs relative to a housing but not relative to one another, and wherein a second control input by the control rod element rotates the first and control discs relative to one another.

9. The manually operable control device according to claim 8, wherein at least one of:
    the two control discs are spaced apart from one another and extend in parallel with one another; and the control rod element extends in a longitudinal direction orthogonal to a planar extension of at least one of the two control discs.

10. The manually operable control device according to claim 8, wherein the at least one drive element comprises a first drive element and a second drive element, the rotational movement about the common axis of the first control disc is actively controlled by the first drive element, and the rotational movement about the common axis of the second control disc is actively controlled by the second drive element.

11. The manually operable control device according to claim 8, further comprising a restoring element, wherein the restoring element is operatively connected to the control rod element and passively guides the control rod element back into a starting position.

12. The manually operable control device according to claim 1, wherein at least one of:
the two control discs are spaced apart from one another and extend in parallel with one another; and
the control rod element extends in a longitudinal direction orthogonal to a planar extension of at least one of the two control discs.

13. The manually operable control device according to claim 12, wherein the at least one drive element comprises a first drive element and a second drive element, the rotational movement about the common axis of the first control disc is controlled by the first drive element, and the rotational movement about the common axis of the second control disc is actively controlled by the second drive element.

14. The manually operable control device according to claim 12, further comprising a restoring element, wherein the restoring element is operatively connected to the control rod element and passively guides the control rod element back into a starting position.

15. The manually operable control device according to claim 1, further comprising a restoring element, wherein the restoring element is operatively connected to the control rod element and passively guides the control rod element back into a starting position.

16. The manually operable control device according to claim 1, further comprising a sensor for detecting a movement direction of the control rod element and a control unit, wherein the sensor is arranged on the control rod element.

17. The manually operable control device according to claim 16, wherein signals of the sensor can be transmitted by means of the control unit to the at least one drive element of at least one of the first control disc and second control disc.

18. The manually operable control device according to claim 1, further comprising a housing containing the first control disc and the second control disc arranged therein, wherein the first control disc is operatively connected to at least one of a first drive element and a first restoring element, and the second control disc is operatively connected to at least one of a second drive element and the first restoring element.

19. The manually operable control device according to claim 18, wherein both the first control disc and the second control disc are cylindrically shaped, and wherein a radius of the first control disc is equal to a radius of the second control disc.

20. The manually operable control device according to claim 1, further comprising a vehicle and at least one moveable element, wherein the manually operable control device at least steers or accelerates at least one of the vehicle and the at least one moveable element.

\* \* \* \* \*